July 22, 1969

H. E. WATKINS 3,457,080

METHOD OF AND APPARATUS FOR THE ELECTROSTATIC APPLICATION
OF SOLID PARTICLES TO FOOD PRODUCTS

Filed Feb. 7, 1966

INVENTOR
Harley E. Watkins

BY
Van Valkenburgh & Lowe

ATTORNEYS

INVENTOR
Harley E. Watkins

INVENTOR
Harley E. Watkins
BY Van Valkenburgh + Lowe
ATTORNEYS

United States Patent Office 3,457,080
Patented July 22, 1969

3,457,080
METHOD OF AND APPARATUS FOR THE ELECTROSTATIC APPLICATION OF SOLID PARTICLES TO FOOD PRODUCTS
Harley E. Watkins, Applewood Mesa, Colo., assignor to Lipoma Electronics, Delano, Calif., a copartnership
Filed Feb. 7, 1966, Ser. No. 525,460
Int. Cl. A23l 1/34
U.S. Cl. 99—1                                                 9 Claims

ABSTRACT OF THE DISCLOSURE

Food products are treated by condiment particles and the like by causing such particles to move along an electrified surface such that such particles acquire a charge through contact with such surface. Such charge is opposite to an electric charge imparted to a food product by a conveyor belt upon which such food product rests and is conveyed. The charged particles gravitate from their charging surface toward the conveyor belt and are attracted to the food product such that most, if not all, of such particles are distributed on the food product instead of on the conveyor belt.

---

This invention relates to the electrostatic application and distribution of solid particles to food products, such as the application of flour to bread, rolls or the like, the application of salt, pepper, barbecue sauce powder, cheese, garlic and other condiments of flavoring to crackers, pretzels, nuts and other food products, the application of sugar to cereals or frosting to cookies, rolls, buns and the like, the application of tenderizing powders or other flavoring to meat products and the like, as well as the application of other condiments, flavoring and the like to various other types of food products.

Among the objects of this invention are to provide a novel method and apparatus for the electrostatic application of solid particles to various types of food products; to provide such a method and apparatus by which the distribution of solid particles on the food product is made more readily, to increase the ease of distribution of solid particles on such food products, such as carried by a conveyor or the like beneath a laterally elongated feeding device; to provide such a method and apparatus which is effective in operation; and to provide such apparatus which is simple in construction, is reliable in operation and is particularly adapted to carry out the method of this invention.

Additional objects and the novel features of this invention will become apparent from the following description, taken in conjunction with the accompanying drawings, in which.

Figure 1:
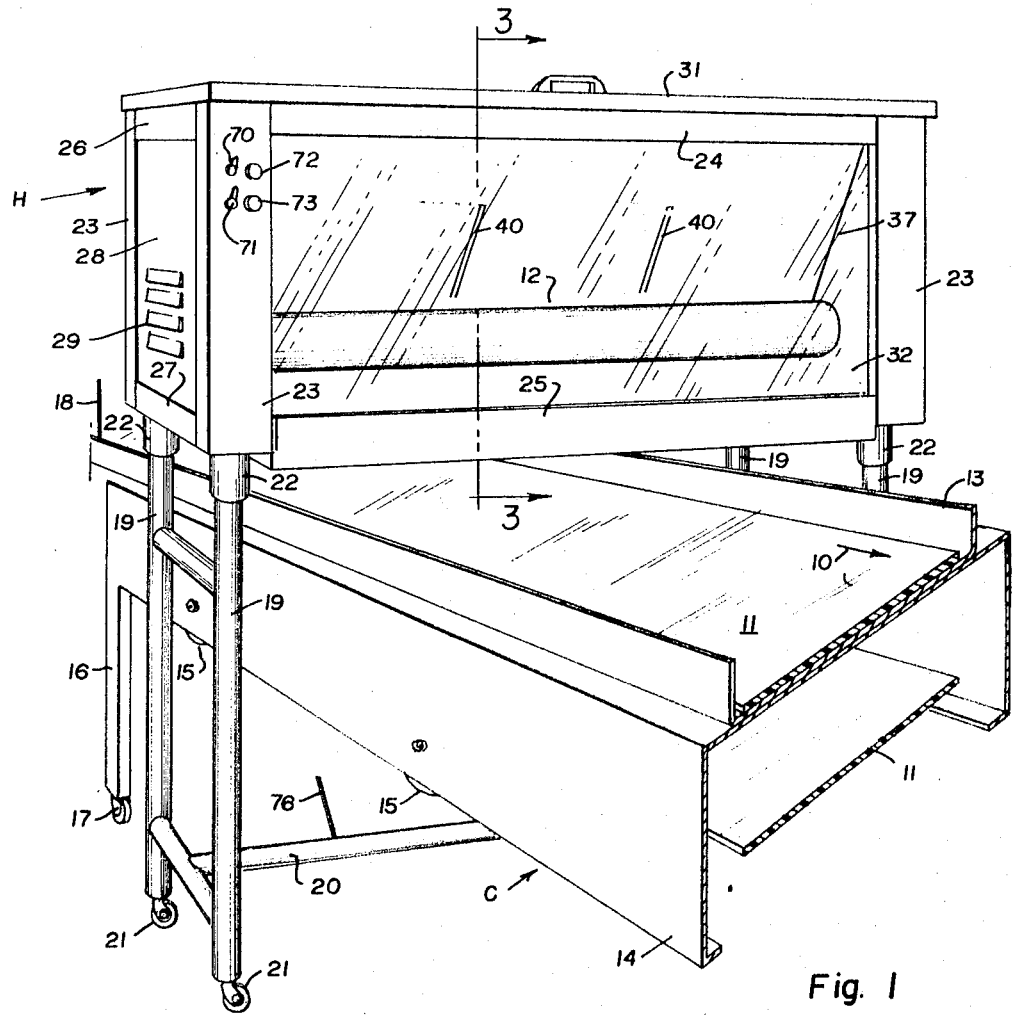
FIG. 1 is a fragmentary front perspective view of apparatus of this invention for applying solid particles to a series of food products travelling along a conveyor beneath a distributing roll.

As illustrated in FIG. 1, a series of food products, to which the solid particles are to be applied, are moved in succession, in the direction of arrow 10, by a conveyor C, which may include a belt 11, beneath a housing H in which is installed a feed cylinder or distributing roller 12 having a width corresponding to the width of the conveyor belt 11. In accordance with this invention, a potential difference, as on the order of 10,000 to 30,000 volts is applied between the cylinder 12 and the belt 11, as in a manner hereinafter described, so that the solid particles falling off cylinder 12 will be charged by the cylinder to a high potential, opposite to that of the products on belt 11, conveniently the negative or ground terminal, and will be attracted to the products so as to be distributed relatively evenly thereon and also tend to "wrap around" and adhere to inclined or irregular surfaces or even on the underside of the products. As will be evident, the distribution of the solid particles will not only be more effective but will also tend to be more uniform than sprinkling by hand or by shaking machines.

Conveyor C may include an upper channel 13 along which the upper reach of belt 11 moves and an open bottom, box shape frame 14 which supports channel 13 and in which is mounted a series of rollers 15 for supporting the lower reach of belt 11, the drive roller for which (not shown) is conventional and conventionally driven, conveniently being mounted at the front end of frame 14. Frame 14 may also be provided with a series of legs 16, each provided with a caster 17, so that the conveyor may be shifted to a desired position of use, as with the rear end beneath the discharge of a potato chip producing machine or any other type of equipment for producing the product to which the solid particles are to be supplied. Conveyor C may be grounded by a wire 18 attached to channels 13, as in FIG. 1. Conveyor C may be any other suitable type of conveying mechanism, such as a reciprocating conveyor to which a slow motion is applied in the direction of the arrow 10, and a quick return motion in the opposite direction, so that the conveyor, in effect, slips beneath the products on the return stroke, with the net effect being a movement of the products in the direction of arrow 10.

Housing H is supported by a series of legs 19, which are cross braced laterally, connected at the bottom by a transverse brace 20 and provided with casters 21, so that the housing may be moved to any desired position along the conveyor, either directly across the same or obliquely thereto, as in FIG. 1. The position of housing H on legs 19 may be fixed or may be adjustable in any conventional manner at collars 22. Housing H may include upright corner posts 23, connected at the front and rear by upper and lower bars 24 and 25, respectively, and at each end by upper and lower bars 26 and 27, respectively, these parts being formed of a suitable material, such as stainless steel. Removable end panels 28, which also may be formed by stainless steel, are provided with louvres 29 to permit the discharge of heated air. As in FIG. 3, a metal angle 30, also of stainless steel, extends across the lower rear of the housing to support the equipment shown in FIG. 2 and described below. A removable top cover 31 permits replenishment of the supply of solid particles, such as salt, sugar or other types of particles, in a hopper formed of electrically insulating and preferably transparent material, such as plastic, preferred to glass because of breakage problems of the latter, and also described below. Front and rear, removable panels 32 and 33 of the housing may also be formed of transparent material, such as plastic, to facilitate a view of the solid particles in the hopper from either front or rear, or the front panel only may be transparent and the rear panel stainless steel, as shown.

Figure 5:
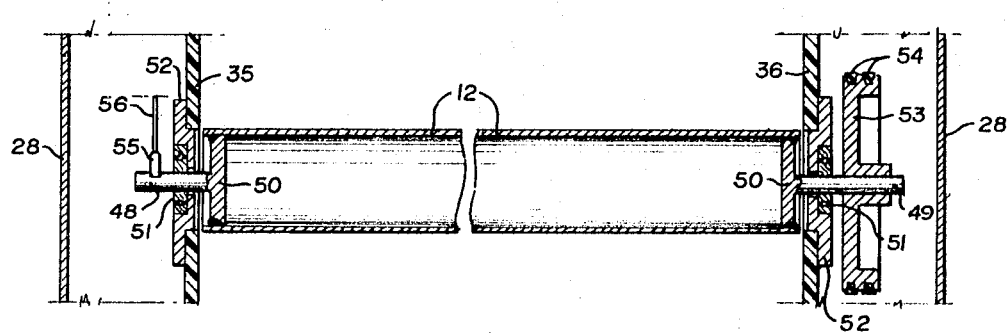
FIG. 5 is a condensed, fragmentary vertical section, on an enlarged scale, taken through the feed roller or cylinder along line 5—5 of FIG. 3, on a further enlarged scale.
Figure 6:
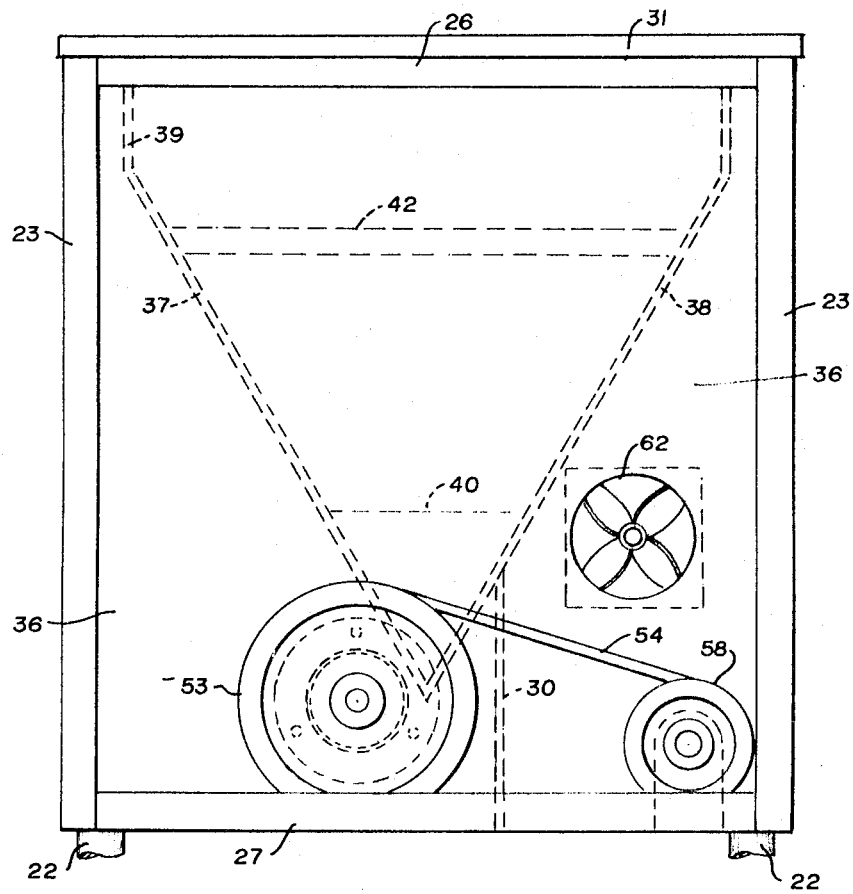
FIG. 6 is an end elevation, on a further enlarged scale, of the housing of FIG. 2, with an end plate removed.

The hopper inside housing H is supported by its end walls 35 and 36, as in FIGS. 5 and 6, which are rectangular and extend between and are mounted on the posts 23 at the inside edge of each, being spaced from the end panels 28, as in FIG. 5. The plastic, transparent front and rear walls 37 and 38, respectively, of the hopper are secured by adhesive in grooves machined in the end panels 35 and 36 and are inclined downwardly toward each other, as in FIGS. 3 and 6, with a plastic plate 39 forming a vertical continuation at the upper end of each of the front and rear walls. A pair of inverted trapezoidal, upright braces 40, also of transparent plastic, are secured by adhesive in grooves formed for that purpose in the front and rear walls, the upper and lower edges of each being spaced from the upper and lower edges, respectively, of the front and rear walls of the hopper, as in FIG. 6. A screen 41, as in FIG. 3, may be attached to and supported by a frame 42 engaging the front and rear walls of the hopper, the screen and frame being preferably formed of stainless steel. Screen 41 may be placed in the upper portion of the hopper, to subdivide any cake before it falls into the lower portion of the hopper, particularly when the particles are of hygroscopic material, such as salt or sugar, to minimize the possibility of the particles forming a cake which bridges across the hopper and prevents the free flow of the particles into the lower end of the hopper at any area.

Figure 4:
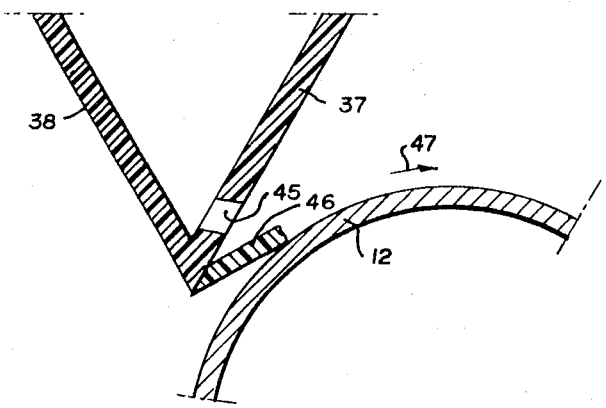
FIG. 4 is a fragmentary enlargement of a portion of FIG. 3, including the lower end of a hopper, a portion of a feed cylinder or roller and a distributing strip or wiper.

At the lower end of the hopper, as in FIG. 4, the front wall 37 may be provided with a series of closely spaced holes or slots 45 through which the solid particles flow onto the cylinder 12. To provide a more even flow, a generally upwardly inclined strip or wiper 46, formed of a flexible plastic, such as glass coated Teflon, or other suitable flexible, electrically non-conducting material, is attached to the underside of front wall 37 below holes 45 and engages the surface of cylinder 12, which rotates in the direction of arrow 47. The solid particles flowing through holes 45 build up on the strip 46 until they flow over the upper edge of the strip onto cylinder 12. As will be evident, lateral flow onto strip 46 at the positions between the holes 45 will tend to achieve a more uniform lateral distribution of the particles, while the strip 46 will provide a small reservoir of particles, as it were, from which the cylinder 12 draws its supply. As the particles flow onto cylinder 12, they will become charged to the voltage supplied to the cylinder, as described below.

The cylinder 12, as in FIG. 5, may be hollow, being conveniently formed from tubular stainless steel stock and supported for rotation by a pair of stub shafts 48 and 49, in turn attached to or formed integrally with a disc 50 which may be welded, as shown, or brazed or attached in any other suitable manner to the inside of the cylinder. Each stub shaft 48 and 49 is mounted in a bearing 51, as of the ball thrust type, in turn mounted in a bearing plate 52 attached to the hopper end wall 35 or 36 in a suitable manner, as by cap screws. A pulley 53 is mounted on stub shaft 49 for engagement by one or more belts 54 formed of the usual electrically insulating material, while the high electric potential for charging the particles on cylinder 12 may be applied through a contact 55 of the slip ring type engaging stub shaft 48 and attached to a wire 56.

Figure 2:
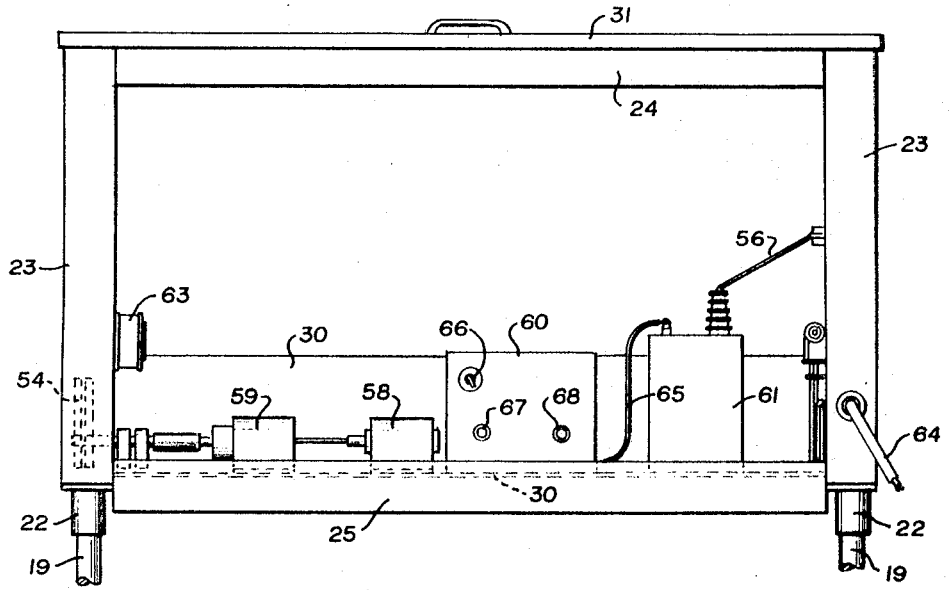
FIG. 2 is a rear elevation of a housing, on an enlarged scale, forming part of the apparatus of FIG. 1 and in which certain parts thereof are installed.
Figure 3:
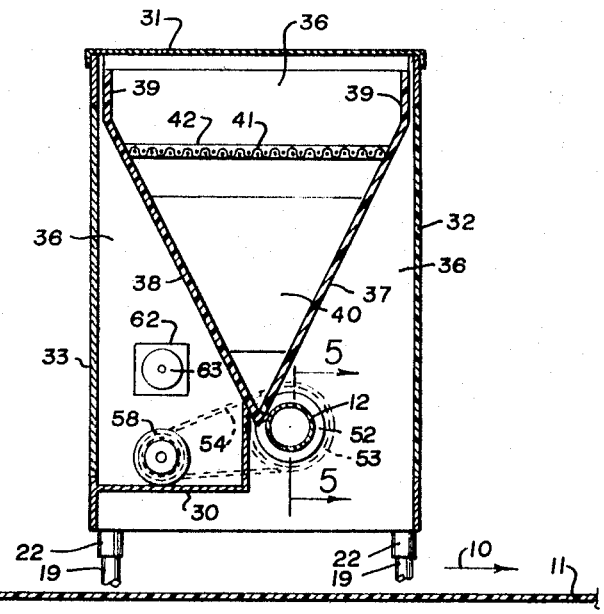
FIG. 3 is a fragmentary vertical section, taken along line 3—3 of FIG. 1, on a slightly enlarged scale.

As will be evident from FIG. 3, the front lower portion of housing H is open below and forwardly of cylinder 12, so that the charged particles may fall off the cylinder by gravity, onto the food products carried beneath the cylinder by belt 11. The angle 30, at the rear of the hopper, as in FIG. 2, provides support for a motor 58 connected to an adjustable speed reducer 59 which drives a pulley engaging belt 54. Angle 30 also supports a control panel 60 and a high voltage transformer 61, the output lead 56 of which is connected to cylinder 12, as described previously, while one or more rectifiers are enclosed within the housing of the high voltage transformer. A fan or blower 62, driven by a motor 63, is mounted on hopper end panel 36, as in FIG. 3, for exhausting heated air from the space behind the hopper and out through louvres 29 in panel 28 of FIG. 1. Electrical current is supplied through a cable 64, while electrical parts installed behind panel 60 are connected to transformer 61 by an input lead 65. Mounted on control panel 60 are a voltage adjustment handle 66 and fuse receptacles 67 and 68. The principal control switches are more conveniently mounted on one of the posts 23, as in FIG. 1, including a high voltage, snap action control switch 70 and a snap action motor control switch 71, a red light 72 which is lit when the high voltage switch is snapped to on position and an amber light 73 which is lit when the drive motor 58 and blower motor 63 are snapped to on position, are mounted adjacent thereto.

Figure 7:
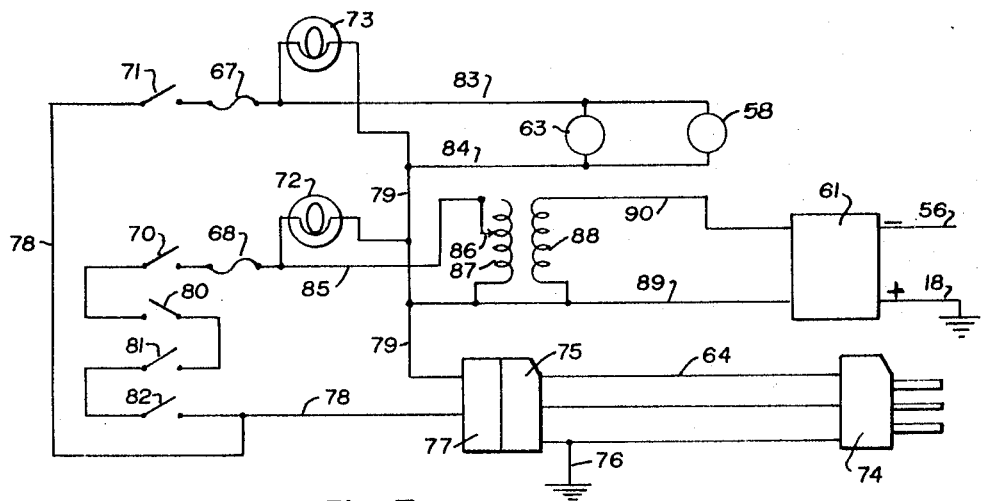
FIG. 7 is a circuit diagram of the apparatus of FIG. 1.
Figure 8:
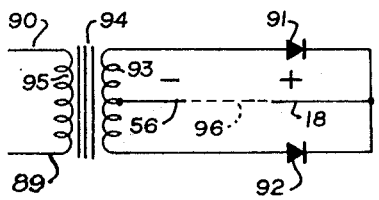
FIG. 8 is a circuit diagram showing one way in which the high voltage applied to certain parts of the apparatus of FIG. 1 may be readily obtained.
Figure 9:
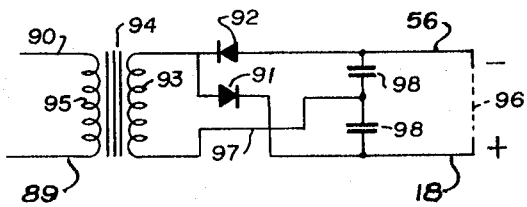
FIGS. 9 and 10 are circuit diagrams alternative to that of FIG. 8.

In the circuit diagram of FIG. 7, cable 64 is connected to a three prong plug 74 at one end and a connector 75 at the opposite end. One wire of cable 64 is a ground wire which is grounded to the chassis of housing H by a wire 76, as to the lower cross brace, as in FIG. 1. A plug 77 is interfitted with connector 75 and a pair of leads 78 and 79 extend therefrom, lead 78 extending to a switch 71 for cylinder drive motor 58 and blower motor 63, as well as being connected to high voltage switch 70 through a plurality of safety switches, such as switches 80, 81 and 82, all in series with switches 70. Safety switches 80, 81 and 82 are microswitches placed at appropriate positions around the apparatus, as at cover 31 and front and rear housing panels 32 and 33, to shut off the high voltage, whenever the top cover or front or rear panels are removed. From fuse 67, in series with switch 71, a wire 83 is connected to one side of motors 58 and 63, with a wire 84 connected to the opposite side thereof and extending to lead 79. Lamp 73 is connected across wires 83 and 84, as shown. From fuse 68, in series with switch 70, a wire 85 is connected to the voltage adjustment contact 86, controlled by handle 66 of FIG. 2, of a voltage regulating transformer having a variable coil 87 and a fixed coil 88, each connected to a branch lead 89 which extends from lead 79 to high voltage transformer 61. A wire 90 connects the opposite side of coil 88 with the high voltage transformer 61, while light 72 is connected across wire 85 and lead 79, as shown. The high voltage transformer may, as indicated, include a rectifier for producing pulsating D.C. by eliminating one half wave of the A.C. If desired, a voltage doubler circuit, as in FIG. 8, may be incorporated in the high voltage transformer, as through the use of a pair of rectifiers 91 and 92, connected to opposite ends of secondary winding 93 of the transformer, having a core 94 and a primary winding 95, to opposite ends of which lead 89 and wire 90 are connected. Rectifiers 91 and 92 are both connected with wire 18, while high voltage wire 56 is connected to the center of secondary winding 93. Dotted line 96 indicates the normally open circuit condition. In the doubler circuit of FIG. 9, rectifier 91 is again connected between one end of secondary winding 93 and wire 18, but rectifier 92 is connected, in the opposite direction, between the same end of winding 93 and wire 56. Also, the opposite end of winding 93 is connected by a wire 97 between a pair of condensers 98, connected in series across wires 18 and 56. As before, dotted line 96 indicates the normally open circuit condition.

Figure 10:
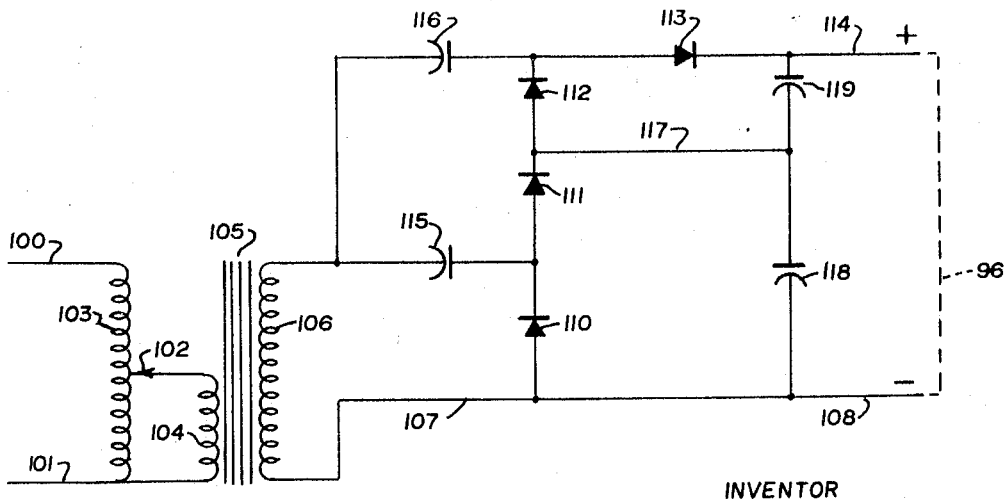

In the voltage quadrupler circuit of FIG. 10, the voltage regulator transformer is incorporated in the high voltage transformer, to which current is supplied by wires 100 and 101, through an adjustable tap 102 movable along a variable coil 103 connected across wires 100 and 101, with tap 102 connected to the opposite end of a fixed primary coil 104 from the connection of the latter to wire 101. In addition to a core 105, this transformer has a secondary winding 106, one end of which is connected by a wire 107 to a negative output wire 108. Four rectifiers 110, 111, 112 and 113 are connected in series between wire 107 and a positive output wire 114, while a pair of capacitors 115 and 116 are connected in parallel with the opposite end of winding 106 and between rectifiers 110, 111 and 112, 113, respectively. In addition, a wire 117 is connected between rectifiers 111, 112 and a pair of capacitors 118, 119, in turn connected in series across wires 108 and 114. Capacitors 115, 116, 118 and 119, with the rectifiers, form a pulse network in which, as each capacitor shifts from plus to minus current, and vice versa, discharges and is later charged in an opposite direction. The normal open circuit condition of output leads 108 and 114 is indicated by the dotted line 96.

The voltage difference between the particles and the food product may be varied over a considerable range, in accordance with the type and size of particles, the rate at which the food product is moved by the conveyor and the amount of solid particles to be applied to increments of area of the products. For solid particles, such as salt, sugar, cinnamon, pepper, cheese, barbecue sauce powder, flour, and the like, the voltage may be varied between 3,000 volts and 50,000 volts. For applying salt, for instance, to a food product, such as potato chips, the voltage may be maintained in the neighborhood of 20,000 volts, being adjusted upwardly or downwardly, in accordance with the amount of particles to be applied to the potato chips at a given amount of time, primarily dependent upon the speed at which the conveyor 11 moves the food product in the direction of arrow 10. The voltage may also be adjusted in accordance with the size of the particles, since smaller particles appear to require a lesser voltage than larger particles. Thus, particles of cheese, which are to be applied to potato chips, would normally require a higher voltage than salt, for instance, to be applied to potato chips.

Since the food product is charged through the conveyor 11, two or more of the devices of this invention may be mounted in spaced positions along the conveyor 11, so that one type of solid particle may be applied by one device, and another type of particle applied by a subsequent device. For example, sugar and cinnamon may be applied to sweet rolls. Also, salt and cheese may be applied to potato chips. In some instances, two different types of particles may be mixed together and fed to and applied by the same device, although such mixing should be thorough and care should be taken that the particles are fed, as from the hopper, in a thoroughly mixed condition and in substantially the same proportions as desired to be finally applied to the food product.

It will be noted that the hopper wiper 46 and roller 12 are shown as merely illustrative of the apparatus, and this invention is not limited to the specific types of parts shown. For instance, a belt passing around a roller may be utilized, instead of a roller. Thus, the roller 12 is merely illustrative of surface means having a width corresponding to the conveying means and spaced above the conveying means, such surface means being adapted normally to discharge particles carried thereby, so that the particles will normally fall by gravity onto the food product moved by the conveying means. As will be evident, various other substitutions in the parts of the apparatus may be made.

Although a preferred embodiment of this invention has been illustrated and described, it will be understood that other embodiments may exist and various changes may be made, without departing from the spirit and scope of this invention.

What is claimed is:

1. A method of applying solid particles to a plurality of food products comprising: moving said food products along a generally horizontal path of a predetermined width and in succession past a predetermined area of the same width; establishing an electric charge on said food products by contact with said path as they are being so moved; feeding said particles in a path of substantially the same width and above the path of said food products, then downwardly by gravity onto said food products in said area; and establishing a relatively high voltage difference between said particles and said food products by establishing a charge on said particles opposite to that charge established on said food products such that said particles are attracted to and distributed on said food products.

2. A method as defined in claim 1, including adjusting the relative speed of said food product movement and said particle feed and adjusting said high voltage difference in accordance with the characteristics of said food product and said particles.

3. Apparatus for applying solid particles to a plurality of food products comprising: conveying means for moving said food products generally horizontally past a predetermined area; surface means having a width corresponding to said conveying means and spaced above said conveying means, said surface means being adapted to discharge particles carried by said surface means so that said particles will fall by gravity onto said food products; means for supplying said particles to said surface means; and means for establishing a relatively high voltage difference between said surface means and said conveying means to cause said particles and said food products to have a similar high voltage difference, said surface means from which said particles are discharged imparting an electric charge to said particles opposite to the electric charge imparted to said food products by said conveying means such that said particles are attracted and distributed on said food products.

4. Apparatus as defined in claim 3, wherein said surface means includes a cylindrical roller which is rotated about an axis transverse to the direction of movement of said conveying means.

5. Apparatus as defined in claim 4, wherein said supplying means includes a hopper disposed above said roller.

6. Apparatus as defined in claim 5, including means for distributing said particles from said hopper to said roller.

7. Apparatus as defined in claim 6, wherein said distributing means comprises a flexible wiper engaging said roller beneath said hopper and on the side opposite the side of discharge of said particles.

8. Apparatus as defined in claim 5, wherein said hopper is formed of a transparent, electrically insulating material and includes downwardly converging front and rear walls and upright end walls; and transverse partitions extending between said front and rear walls and spaced from both the upper and lower end of said hopper.

9. Apparatus as defined in claim 5, including:
a housing enclosing said hopper and having removable front and rear walls and a removable top, said front wall being transparent; and
means actuated by removal of either of said walls or said top for shutting off said current supply.

References Cited

UNITED STATES PATENTS

| | | | |
|---|---|---|---|
| 2,128,907 | 9/1938 | Benner et al. | 117—25 X |
| 2,245,301 | 6/1941 | Schacht | 117—17 |
| 2,565,454 | 8/1951 | MacKenzie et al. | 99—229 X |
| 2,845,351 | 7/1958 | Baruch | 99—71 |
| 3,273,016 | 9/1966 | Buhler | 118—636 X |

LIONEL M. SHAPIRO, Primary Examiner

U.S. Cl. X.R.

99—80, 83, 86, 90, 92, 100, 140, 234; 107—54; 117—17; 118—308, 626, 636; 317—3